US005378795A

United States Patent [19]

Bryant

[11] Patent Number: 5,378,795
[45] Date of Patent: Jan. 3, 1995

[54] POLYAZOMETHINES CONTAINING TRIFLUOROMETHYLBENZENE UNITS

[75] Inventor: Robert G. Bryant, Poquoson, Va.

[73] Assignee: The United States of America as represented by the Administrator of the National Aeronautics and Space Administration, Washington, D.C.

[21] Appl. No.: 105,251

[22] Filed: Jul. 30, 1993

[51] Int. Cl.$^6$ ............................................. C08G 10/02
[52] U.S. Cl. ................................... 528/244; 528/230; 528/232; 528/243; 528/266
[58] Field of Search ............... 528/230, 232, 243, 244, 528/266

[56] References Cited

U.S. PATENT DOCUMENTS 4,048,148  9/1977  Morgan .............................. 528/149
4,122,070 10/1978  Morgan .............................. 528/149

OTHER PUBLICATIONS

CA 116(10):85359k.
CA 115(24):257613m.

Primary Examiner—Samuel A. Acquah
Attorney, Agent, or Firm—George F. Helfrich; Joy L. Bryant

[57] ABSTRACT

Soluble, amorphous, aromatic polyazomethine polymers and copolymers were prepared by reacting a dialdehyde monomer with a diamine monomer containing trifluoromethylbenzene and various combinations thereof in a solvent, such as N,N-dimethylacetamide. The reaction was heated to reflux yielding a polyazomethine which, after cooling to room temperature, was precipitated. These polymers and copolymers may be used to make films, coatings, composites and adhesives.

7 Claims, 2 Drawing Sheets

Wide Angle X-Ray Diffraction Patterns of Polyazomethine Films

POLYAZOMETHINES CONTAINING TRIFLUOROMETHYLBENZENE UNITS

ORIGIN OF THE INVENTION

The invention described herein was made by an employee of the United States Government, and may be manufactured and used by or for the Government without payment of any royalties thereon or therefor.

BACKGROUND OF THE INVENTION

1. Field of the Invention

The present invention relates to aromatic polyazomethines. In particular, it relates to aromatic polyazomethines containing trifluoromethylbenzene units in the polymer backbone structure.

2. Description of the Related Art

Aromatic polyazomethines or polyimines have been classified as highly conjugated low molecular weight materials which are generally insoluble and intractable. The insolubility of these polymers makes solution synthesis difficult. Melt polymerization techniques have resulted in infusible materials which cannot be further fabricated into thin films or remolded.

Early attempts to synthesize polyazomethines or polyimines involved the condensation reactions of dialdehydes with various aryl diamines in several solvents. This resulted in the formation of yellow-to-orange insoluble, infusible brickdust products of low molecular weights which ranged from 500 to 1000 g/mol. The low molecular weights were attributed to the insolubility of the condensation products which separated rapidly from the solvent media causing the polymerization to stop before high molecular weights could be obtained. In order to increase the molecular weights of the products, solvents were changed, catalysts were added, the reaction temperature was varied and dehydrating agents were used, none of which resulted in a significant improvement in the molecular weight. The degree of polymerization ranged from 3.4 to 8.0, as calculated by nitrogen analysis, for these aromatic polyazomethines. The early work, chemistry and properties of various aromatic polyazomethines is reviewed by G. F. D'Alelio (G. F. D'Alelio, *Encyclopedia of Polymer Science and Engineering*, Vol. 10, 1st Edition, John Wiley and Sons, New York, 1969, p. 659) and G. F. D'Alelio et al. (G. F. D'Alelio, J. V. Crivello, R. K. Shoeing, and T. F. Huemmer, *Journal of Macromolecular Science and Chemical Education*, A1 (Z), 1161, (1967)).

In order to synthesize high molecular weight polyazomethines, D'Alelio et al. used melt polymerization techniques and bis-exchange reactions. The polymers which resulted from these synthetic approaches yielded shiny black, infusible materials. They were sparingly soluble in dimethylformamide and completely soluble in sulfuric acid. However, sulfuric acid degraded the polyazomethines causing them to become a dark color in solution and form the amine-salt ions which caused the intrinsic viscosities to increase with time.

Despite several undesirable physical properties displayed by polyazomethines, it was hypothesized that these rigid polymers might display thermotropic behavior if their melting points could be decreased below their decomposition temperature. Morgan et al. (P. W. Morgan, S. L. Kwolek, and T. C. Pletcher, *Macromolecules*, 20,729, (1987) and P. W. Morgan U.S. Pat. Nos. 4,048,148 and 4,122,070), synthesized a series of polyazomethines which incorporated toluene, chlorobenzene, anisole, ethane and 1,2-dioxyethane units into the polymer backbone. These polymers were synthesized both in the melt and in solution using a variety of techniques, however, the polymer precipitated in each case. The resulting polyazomethines were then heated to a temperature above their melting point where they displayed thermotropic behavior in the melt and were able to be melt spun as fibers or compression molded into films and bars. The inherent viscosities of these polymers were measured in a 98% sulfuric acid solution and ranged from 0.4 to 2.0 dL/g for the gelled solution polymerization products, and up to 6.0 dug for the melt spun fibers. No data was given for the film properties.

Wojtkowski (P. W. Wojtkowski, *Macromolecules*, 20, 740, (1987) and Harris et al. (F. W. Harris and K. Sridhar, *Polymer Preprints*, 29 (2), 304, (1988)) also inserted aliphatic units and substituted benzene rings into the polymer backbone in order to generate polyazomethines which displayed melt anisotropy. When these polymers were heated above their melting points, some of them could be melt spun as organic fibers. However, these thermotropic polyazomethines were only soluble in strong acids, hot protic solvents and salt solutions which severely limited any possibility of solution processing.

Imai et al. (Y. Imai, N. N. Maldar, and M. Kakimoto, *Journal of Polymer Science, Polymer Chemistry Edition*, 22, 3771, (1984)) used aryl diamines with large pendant aromatic fused ring structures to synthesize soluble polyazomethines. One series of soluble polyazomethine copolymers were synthesized by condensing various ratios of isophthalaldehyde (IPAd) and terephthalaldehyde (TPAd), with 4,4'-oxydianiline (ODA) and 2,5-bis(4-aminophenyl)-3,4-diphenylthiophene (TPTDA) in N-methylpyrrolidinone (NMP). The resulting copolymers had inherent viscosities ranging from 0.45 to 0.84 dL/g depending on either the IPAd/TPAd or the ODNTPTDA ratio. However, the polyazomethine copolymers which contained less than 40% IPAd in the IPAd/TPAd ratio when condensed with TPTDA were insoluble in NMP, as were the polyazomethine copolymers containing only IPAd and greater than 50% ODA in the ODA/TPTDA ratio.

Another series of polymers was made by Mohite et al. (S. S. Mohite and P. P. Wadgaonkar, *Polymer Preprints*, 31 (1), 482, (1990)) who condensed IPAd or TPAd with 9,9-bis(4-aminophenyl)fluorene or hexamethylene based diamine in m-cresol. Copoly(azomethine-ester)s containing 6F-isopropylidine units were also made. Both of these types of polymers were soluble in a variety of solvents, but the resulting inherent viscosities were below 0.3 dL/g and the cast films were very brittle and of little consequence.

The polyazomethines which have been synthesized thus far have only been useful as organic fibers. Generally, these polymers are highly conjugated and intractable. Those which display some solubility either have not demonstrated any mechanical integrity or are soluble in solvent systems which are detrimental for solution processing into films, matrix resins for composites, or adhesives and coatings.

An object of the present invention is to prepare soluble, amorphous, aromatic polyazomethines which contain trifluoromethylbenzene units.

Another object is to prepare polyazomethines which remain isotropic after thermal treatment.

Another object is to prepare films, adhesives, composites, and coatings from these soluble polyazomethines.

SUMMARY OF THE INVENTION

Several novel polyazomethines and polyazomethine copolymers were prepared. These polymers and copolymers were derived from diamine monomers which contain trifluoromethylbenzene groups and are reacted with a dialdehyde such as terephthalaldehyde or isophthalaldehyde in a solvent such as N,N-dimethylacetamide (DMAc). After heating to reflux for approximately 16 hours, the resulting polymer was precipitated in methanol. The polymer powder was redissolved in DMAc, filtered and cast on glass plates and dried at room temperature until it was tack free. The polymer was then thermally staged under vacuum to afford thin films. The unoriented films were analyzed by several methods to determine their thermal, physical, solution and mechanical properties.

The polymer films which were prepared from the polyazomethine polymers and copolymers displayed several unusual properties which are uncharacteristic of aromatic polyazomethines. The polymer films remained soluble in common organic solvents. None of these films had a detectable glass transition temperature by differential scanning calorimetry (DSC). After thermal annealing, the films remained amorphous as opposed to becoming anisotropic as was previously seen in the art and expected for these systems. Some of these polymer films displayed excellent mechanical properties which were not achieved by the polymers of the prior art.

These soluble, amorphous, aromatic polyazomethines have the repeat unit:

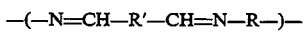

wherein R is selected from the group consisting of:

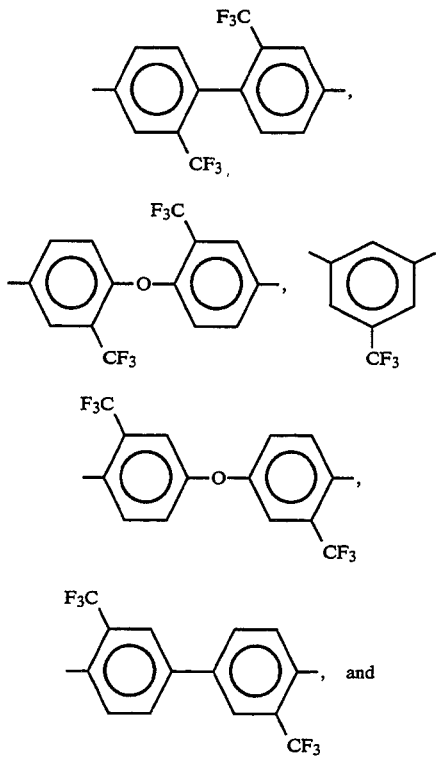

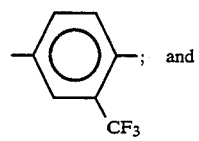

$R'$ is selected from the group consisting of:

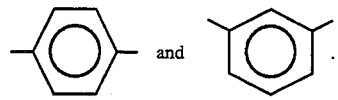

These polymers have many more uses than those of the prior art and their increased solubility allows them to be useful for many more applications than those of the prior art. In addition to making films, these polymers can be used to make coatings, composites and adhesives.

DESCRIPTION OF THE PREFERRED EMBODIMENTS

Figure 1:
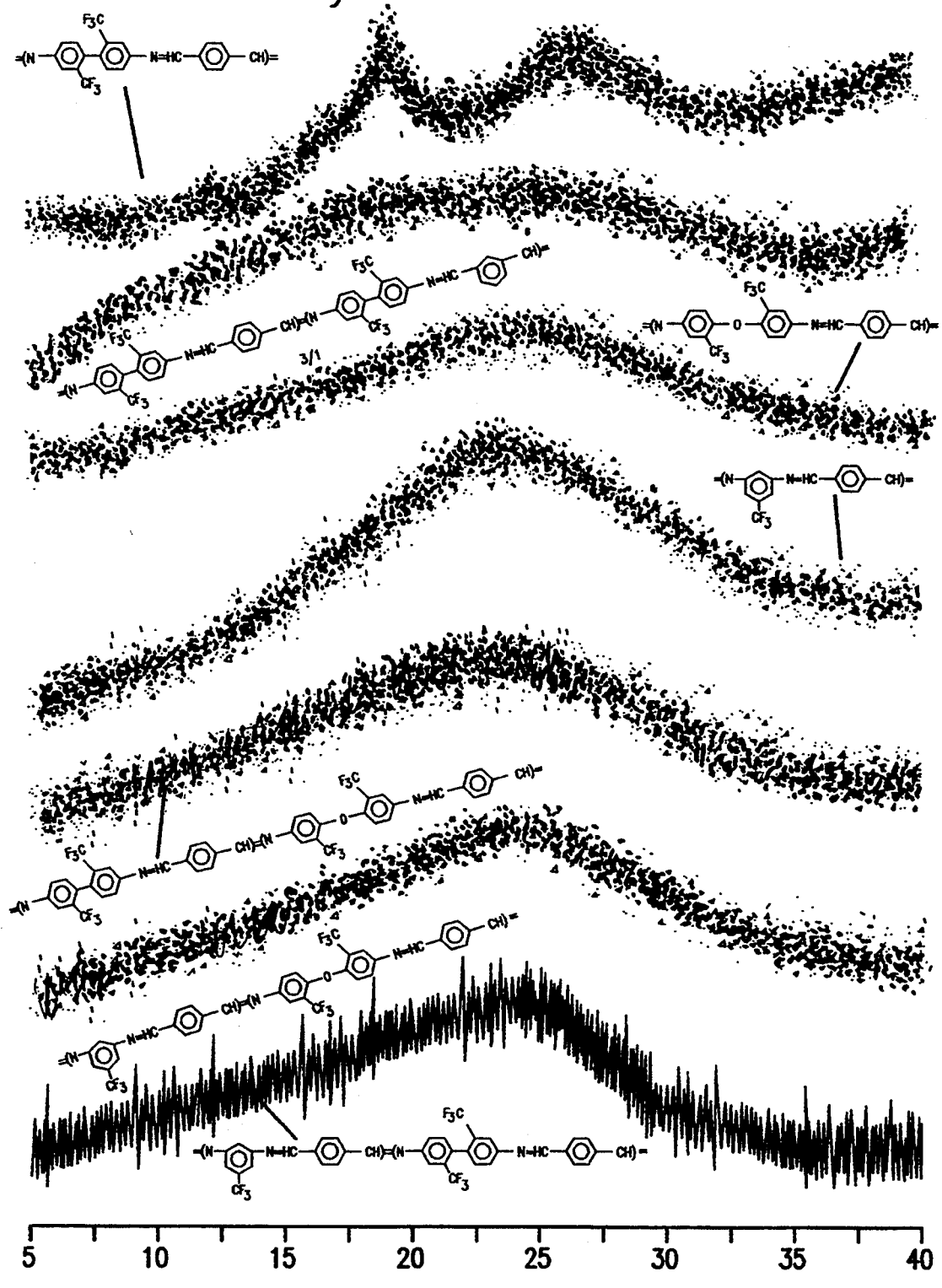
FIG. 1 is a composite of the wide angle X-ray diffraction patterns for each of the polyazomethine polymers and copolymers.

Polyazomethine polymers and copolymers were prepared by the condensation of diamines with dialdehydes according to the following reaction scheme:

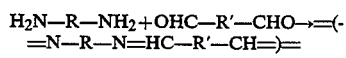

The diamines used for the preparation of the polymers and copolymers of the present invention contain trifluoromethylbenzene units. More specifically, these diamines were: oxybis-4,4'-diamino-2,2'-bis(trifluoromethyl)benzene (1,2,4-OBABTF); 3,5-diamino-benzotrifluoride (3,5-DABTF), both of which are available from Occidental Chemical Corporation; and 2,2'-bis(trifluoromethyl)benzidine (PFMB) which is available from Marshallton Labs Inc. The invention is not limited to these specific diamines and any diamine which contains a trifluoromethylbenzene unit may be used.

The dialdehydes used in preparing the polymers and copolymers of the instant invention were isophthalaldehyde (IPAd) and terephthalaldehyde (TPAd) and were sublimed before use. The invention is not restricted to these specific dialdehydes as any dialdehyde known to those skilled in the art may be used.

In preparing the polyazomethine homopolymers, a dialdehyde monomer was reacted with a diamine monomer containing trifluoromethylbenzene in a solvent such as N,N-dimethylacetamide (DMAc) to afford a 10% solids solution. Other solvents which may be used for this reaction include N-methylpyrrolidinone (NMP), m-cresol, and N,N-dimethylformamide (DMF). The solution was heated to reflux for approximately 16 hours and 20% (by volume) of the solvent was distilled off. After allowing the solution to cool to room temperature, it was poured into cold methanol to precipitate the polymer. The polymer was collected by filtration and dried.

A similar procedure was followed for the preparation of the copolyazomethines, with a modification to the starting materials. Two processes were followed to obtain the copolymers of the instant invention. In the first process, a mixture of the dialdehydes, IPAd and TPAd, was formed. This mixture was prepared at a mole ratio of 25% IPAd to 75% TPAd, however, mixtures prepared at mole ratios ranging from about 5:95 to 95:5 may also be used. This mixture of dialdehydes was reacted with the diamine, 1,2,4-OBABTF, in a solvent. Although, 1,2,4-OBABTF was the specific diamine used, any diamine containing trifluoromethylbenzene may be used. The mixture was heated to reflux for 16 hours and 20% (by volume) of the solvent was distilled off. After allowing the solution to cool to room temperature, it was poured into cold methanol to precipitate the copolymer. The copolymer was collected by filtration and dried.

Various properties of these polymers and copolymers were measured on the resin in solution and on cured polyazomethine films. These properties include: solubility, viscosity, molecular weight, crystallinity, thermal properties, and mechanical properties.

The solvent resistance for the films prepared from the polyazomethine polymers and copolymers were tested by placing the materials in various solvents at a concentration of 0.5 g/dL at 23° C. The films were thermally treated prior to subjecting them to this test. The result that the films were soluble in DMAc and NMP even after thermal treatment was completely unexpected. Since the films were soluble in these solvents, it can be deduced that the polymer and copolymer resins are also soluble in these solvents. Table 1 summarizes the results from this testing.

TABLE 1

| | | Solubility of Polyazomethines | | | | | | | |
|---|---|---|---|---|---|---|---|---|---|
| Dialdehyde(s) | Diamine(s) | DMAc | NMP | DMSO | THF | m-Cresol | $H_2SO_4$ | TEA | $CHCl_3$ |
| TPAd/IPAd (3/1) | PFMB | S | S | SS | S | SS | S | INS | S |
| TPAd | 3,5-DABTF | S | SS | INS | S | INS | S | INS | INS |
| TPAd | 1,2,4-OBABTF | S | S | SS | S | INS | S | INS | S |
| TPAd | 3,5-DABTF/ PFMB (1/1) | S* | SS | INS | SS | INS | INS | INS | INS |
| TPAd | 1,2,4-OBABTF/ 3,5-DABTF (1/1) | SS* | S | SS | S | SS | S | INS | SS |
| TPAd | 1,2,4-OBABTF/ PFMB (1/1) | S | S | INS | SS | SS | S | INS | S |
| TPAd | PFMB | SS | INS | SS | INS | INS | S | INS | INS |
| TPAd/IPAd (3/1) | Bnz | INS | INS | INS | INS | INS | S | INS | INS |
| TPAd | 1,2,4-OBABTF/ 4,4'-ODA (1/1) | INS | INS | INS | INS | INS | S | INS | INS |

S = Soluble
SS = Slightly soluble
INS = Insoluble after 72 hours at 0.5 (g/dl) unless otherwise noted.
4,4'-ODA = 4,4'-Oxydianiline
Bnz = Benzidine the copolymer. The copolymer was collected by filtration and dried.

In the second process, a mixture of two different diamine monomers containing trifluoromethylbenzene was formed. These diamine monomers were mixed at a 50:50 mole ratio but may be used at a ratio from about 5:95 to 95:5. This mixture is reacted with a dialdehyde in a solvent, heated to reflux for 16 hours and 20% (by volume) of the solvent was distilled off. After allowing the solution to cool to room temperature, it was poured Because these polymers are soluble in non-destructive organic solvents, the inherent viscosities ($\eta_{inh}$) could be measured in a DMAc (0.5 g/dL) solution at 25° C using a Ubblohde viscometer. In addition, number average ($M_n$) and weight average ($M_w$) molecular weights were measured in DMAc at 30° C. using gel permeation chromatography (GPC) with universal calibration. These measurements could not be made using these methods for the polymers of the prior art. Table 2 gives the results of this testing.

TABLE 2

| | | Solution Properties of Polyazomethines | | | | |
|---|---|---|---|---|---|---|
| Dialdehyde(s) | Diamine(s) | $\eta_{inh}(dL/g)^a$ | $\eta_{inh}(dL/g)^b$ | $M_n (\times 10^4)^c$ | $M_w (\times 10^4)^c$ | PDI |
| TPAd | 3,5-DABTF | 0.27 | 0.11 | 0.48 | 0.59 | 1.23 |
| TPAd | 1,2,4-OBABTF | 0.47 | 1.14 | 1.62 | 203 | — |
| TPAd | PFMB | 0.54 | Insoluble | 0.27 | $1.90^d$ | $2.54^d$ |
| TPAd | 3,5-DABTF/ PFMB (1/1) | 0.44 | 0.41 | 0.73 | 7.97 | 10.91 |
| TPAd | 1,2,4-OBABTF/ 3,5-DABTF (1/1) | 0.36 | $0.11^e$ | 0.22 | 12.90 | — |
| TPAd | 1,2,4-OBABTF/ PFMB (1/1) | 0.42 | 1.83 | 1.98 | 471 | — |

TABLE 2-continued

| | Solution Properties of Polyazomethines | | | | |
|---|---|---|---|---|---|
| Dialdehyde(s) | Diamine(s) | $\eta_{inh}$ (dL/g)[a] | $\eta_{inh}$ (dL/g)[b] | $M_n$ (× 10⁴)[c] | $M_w$ (× 10⁴)[c] | PDI |
| TPAd/IPAd (3/1) | PFMB | 0.38 | 1.22 | 1.72 | 24.73 | 14.39 |

[a]Inherent viscosit taken in DMAc at 25° C. using a concentration of 0.5 g/dL on the precipitated polymer.
[b]Inherent viscosity taken in DMAc at 25° C. using a concentration of 0.5 g/dL on the polymer film.
[c]Number and weight average molecular weight, and polydispersity index obtained on film in DMAc at 30° C. using a GPC and universal calibration.
[d]Obtained from the precipitated polymer, film is insoluble.
[e]Inherent viscosity taken in DMAc at 25° C. using a concentration of 0.25 g/dL on the polymer film.

Wide angle X-ray diffraction was performed on the polymers and copolymers in order to determine their crystallinity. These patterns are shown in FIG. 1. These patterns show that the polyazomethine polymers and copolymers of the present invention are completely amorphous. A property which was unexpected for these polymers especially since they had been thermally annealed.

Figure 2:
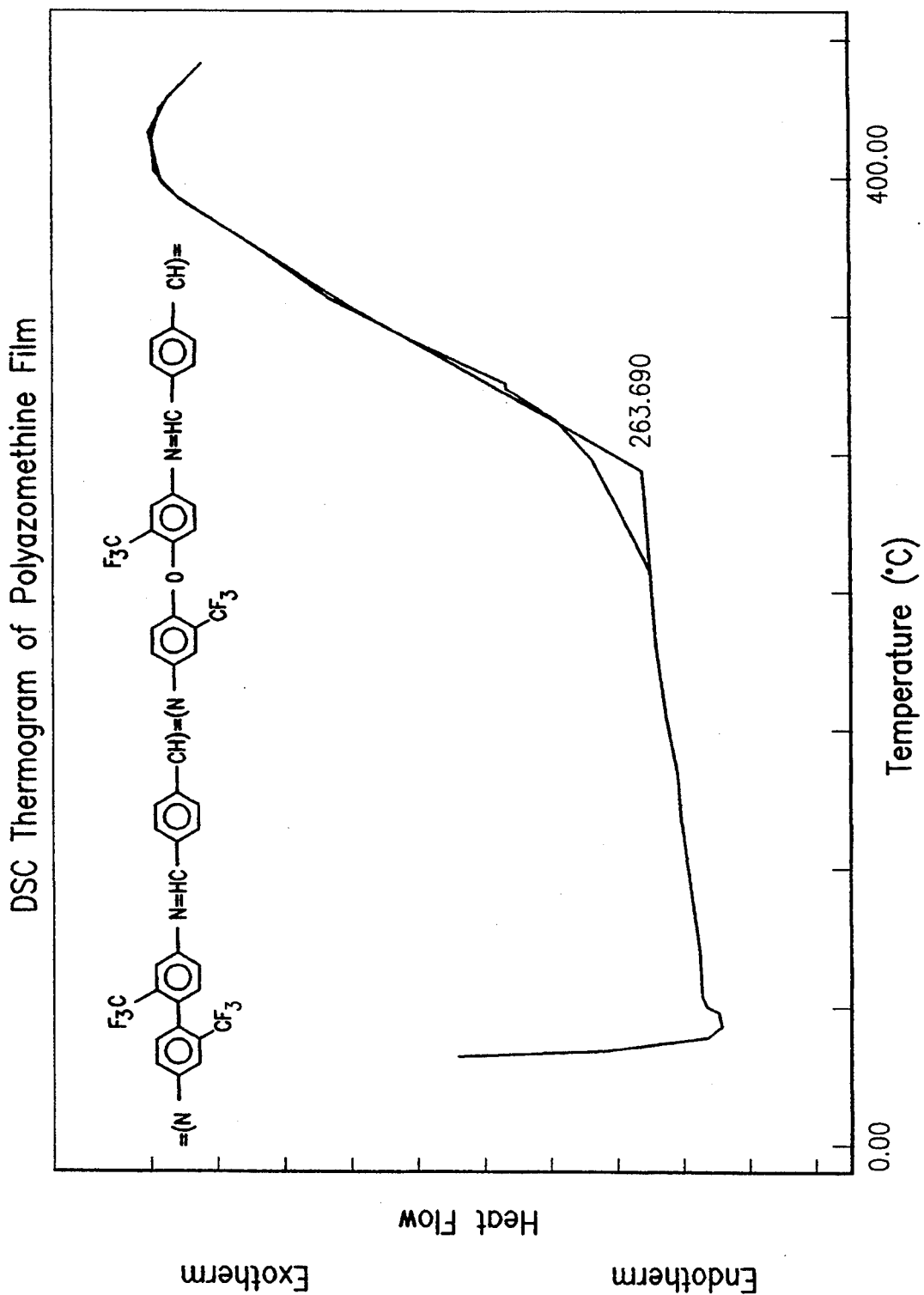
FIG. 2 is the DSC thermogram for a polyazomethine copolymer.

The thermal properties of these polymers and copolymers were tested using differential scanning calorimetry (DSC), thermal mechanical analysis (TMA), dynamic mechanical spectrometry (DMS) and thermogravimetric analysis (TGA). DSC was performed using a heating rate of 10° C./min. FIG. 2 shows the DSC thermogram for one of the polyazomethine copolymers. The DSC thermogram did not display a melting transition ($T_m$) or a second order transition associated with a glass transition ($T_g$) even after quenching and reheating the polymer. This was unexpected because, typically an amorphous polymer will show a glass transition temperature after annealing. The values reported in Table 3 are the values taken at the tangent of the change in the slope on the temperature vs heat flow curve. TMA was performed at a heating rate of 5° C./min under a 2 g load and DMS was performed at a heating rate of 4° C./min using a frequency of 1 Hz and a 2 g load. The Tg (TMA) and tanδ (DMS) indicate that these transitions occur from 200°-260° C., and that the changes in the slopes of the DSC thermogram curves were not caused by exothermic curing or heat of crystallization of the polyazomethine films. These values are reported in Table 3.

TABLE 3

| | Thermal Properties of Polyazomethines | | | | | |
|---|---|---|---|---|---|---|
| | | Tan (°C.) | Tg (°C.) | Tan δ (°C.) | 5% Weight Loss (°C.)[d] | |
| Dialdehyde(s) | Diamine(s) | DSC[a] | TMA[b] | DMS[c] | Air | Nitrogen |
| TPAd | 3,5-DABTF | 310 | e | e | 352 | 367 |
| TPAd | 1,2,4-OBABTF | 224 | 208 | 213 | 383 | 417 |
| TPAd | PFMB | 253 | e | e | 329 | 348 |
| TPAd | 3,5-DABTF/PFMB (1/1) | 269 | 251 | 246 | 353 | 384 |
| TPAd | 1,2,4-OBABTF/3,5-DABTF (1/1) | 262 | 213 | e | 297 | 303 |
| TPAd | 1,2,4-OBABTF/PFMB (1/1) | 264 | 223 | 208 | 352 | 393 |
| TPAd/IPAd (3/1) | PFMB | 252 | 249 | 242 | 396 | 425 |

[a]Estimated from tangent in heat flow vs temperature curve using a heating rate of 10° C./min. The indication of Tg by a step transition is not apparent.
[b]Taken from the change in slope of the length vs temperature curve using a 5 g load and a heating rate of 5° C./min.
[c]Obtained from the maximum of the tan δ vs temperature curve of a film in tensile at a frequency of 1 Hz and a heating rate of 4° C./min.
[d]Taken from thermogravinametric analysis using a heating rate of 2.5° C./min.
[e]Film was extremely brittle, no data obtained.

The mechanical testing of these polymers was performed at 23° C. using a strain rate of 0.2 in/min in accordance with ASTM D-882. The tensile strengths and moduli of these films ranged from 12 to 17 ksi and 320 to 550 ksi respectively, with elongations ranging from 3% to 13% and densities of 1.3 g/cm³. The thermal coefficient of expansion (TCE) was measured on thin films using a heating rate of 5° C./min under a 10 g load and recorded at 18° C. intervals from 60°-50° C. The results from this testing is recorded in Table 4 along with the other mechanical test data.

TABLE 4

| | Mechanical and Physical Properties of Polyazomethines | | | | | |
|---|---|---|---|---|---|---|
| Dialdehyde(s) | Diamine(s) | Ten. Mod. (ksi)[a] | Elong. at Break (%)[a] | Ten. Str. at Break (ksi)[a] | TCE (× 10⁻⁶/°C.)[b] | Density (g/cm³)[c] |
| TPAd | 1,2,4-OBABTF/PFMB (1/1) | 516 ± 39 | 6.0 ± 1.9 | 15.7 ± 1.5 | 8.5 ± 0.8 | 1.355 ± 1e⁻³ |
| TPAd | 3,5-DABTF | e | e | e | e | e |
| TPAd | 1,2,4-OBABTF | 326 ± 17 | 12.3 ± 2.8 | 13.1 ± 1.0 | 15.6 ± 3.5 | 1.347 ± 8e⁻⁴ |
| TPAd | PFMB | e | e | e | e | e |
| TPAd | 3,5-DABTF/PFMB (1/1) | 463 ± 28 | 3.7 ± 1.2 | 12.7 ± 2.1 | 9.6 ± 0.9 | 1.376 ± 3e⁻³ |
| TPAd | 1,2,4-OBABTF/3,5-DABTF (1/1) | e | e | e | e | 1.371 ± 3e⁻³ |

TABLE 4-continued

| | Mechanical and Physical Properties of Polyazomethines | | | | | |
|---|---|---|---|---|---|---|
| Dialdehyde(s) | Diamine(s) | Ten. Mod. (ksi)[a] | Elong. at Break (%)[a] | Ten. Str. at Break (ksi)[a] | TCE ($\times 10^{-6}$/°C.)[b] | Density (g/cm$^3$)[c] |
| TPAd/IPAd (3/1) | PFMB | 541 ± 10 | 4.6 ± 0.9 | 17.0 ± 1.0 | 9.0 ± 4.7[d] | 1.354 ± 8e$^{-4}$ |

[a]Polymer film tested at 23° C. using a strain rate of 0.2 in/min (ASTM D-882).
[b]Thermal coefficient of expansion calculated from a polymer film in tension using a heating rate of 5° C./min using a 10 g load from 60° C. to 150° C. at 18° C. increments.
[c]Obtained from polymer films at 23° C. using a zinc chloride/water density gradient column.
[d]From 60° C. to 120° C. at 12° C. increments.
[e]Film was too brittle, no data obtained.

The following are examples which illustrate the preparation of soluble, amorphous, aromatic polyazomethine polymers and copolymers. These examples are merely illustrative of the invention and are intended to enable those skilled in the art to practice the invention in all of the embodiments flowing therefrom, and do not in any way limit the scope of the invention as defined in the claims.

EXAMPLE 1

Polyazomethine Homopolymers

In a 100 mL flask equipped with a nitrogen inlet, overhead stirring assembly, and reflux condenser was placed 1,2,4-OBABTF (4.1472 g, 0.0123 mol), TPAd (1.6545 g, 0.0123 mol), and 50 mL of DMAc. The reaction was heated to reflux for 16 h, followed by removal of ~20% (v) of solvent by distillation. The reaction was cooled to 23° C. and poured into methanol. The resulting yellow precipitate was collected by filtration and dried in vacuo at 135° C. for 6 h to yield 4.6 g (86%) of yellow powder. Inherent viscosity in DMAc at 25° C. using a concentration of 0.5 g/dL:0.47 dL/g.

EXAMPLE 2

Polyazomethine Copolymers Made with Two Different Aldehydes

In a 25 mL flask equipped with nitrogen inlet, overhead stirring assembly, and relux condenser was paced TPAd (0.31 91 g, 2.3777 mmol), IPAd (0.1064 g, 0.7932 mmol), PFMB ( 1.01 59 g, 3.1722 mmol), and 15 g of DMAc. The mixture was heated to reflux for 18 h, followed by the removal of 20% (v) of solvent by distillation. The reaction was cooled to 23° C. and poured into methanol. The resulting yellow precipitate was collected by filtration and dried in vacuo at 135° C. for 6 h affording 1.17g (89%) of yellow powder. Inherent viscosity in DMAc at 25° C. using a concentration of 0.5 g/dL:0.38 dL/g.

EXAMPLE 3

Polyazomethine Copolymers Made with Two Different Diamines

In a 25 mL flask equipped with a nitrogen inlet, overhead stirring assembly, and reflux condenser was placed 1,2,4-OBABTF (0.9904 g, 2.945 mmol), PFMB (0.9433 g, 2.945 mmol), TPAd (0.7902 g, 5.890 mmol), and 15 mL of DMAc. The reaction was heated to reflux for 16 h, followed by removal of ~20% (v) of solvent by distillation. The reaction was cooled to 23° C. and poured into methanol. The resulting yellow precipitate was collected by filtration and dried in vacuo at 135° C. for 6 h to yield 2.15 g (86%) of yellow powder. Inherint viscosity in DMAc at 25° C. using a concentration of 0.5 g/dL:0.42 dL/g.

EXAMPLE 4

Preparation of Films

A 20% (weight/volume) solids polymer/DMAc solution was prepared and spread on a glass plate and dried in air at 23° C. until tack free. The film was then dried in vacuo at 100° C./2 hour, 150° C./2 hour, 200° C./2 hour, then 250° C./2 hour. The resulting film was then removed from the plate by soaking in water.

What is claimed is:

1. Soluble, amorphous, aromatic polyazomethines having the repeat unit:

—(—N=CH—R'—CH=N—R—)— wherein R is selected from the group consisting of:

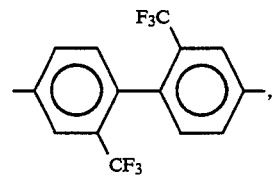

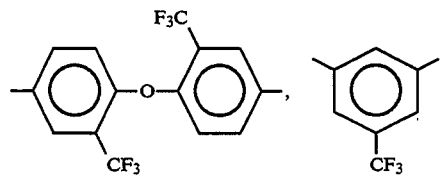

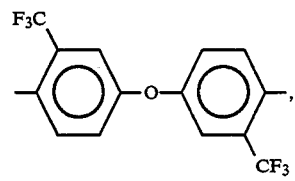

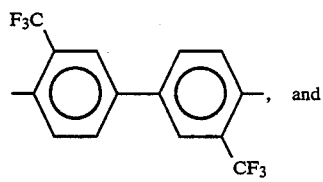

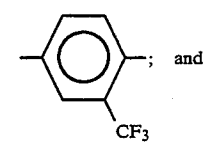

R' is selected from the group consisting of:

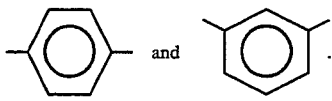

2. Soluble, amorphous, aromatic polyazomethines of claim 1, wherein R is selected from the group consisting of:

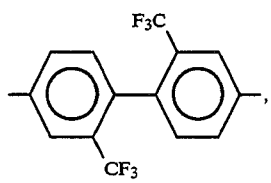

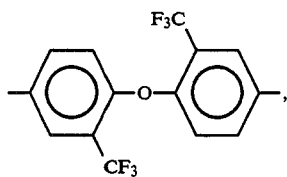

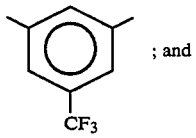 ; and

R' is

3. A soluble, amorphous, aromatic polyazomethine prepared by reacting a dialdehyde with a diamine monomer containing trifluoromethylbenzene in a solvent selected from the group consisting of: N,N-dimethylacetamide, N-methylpyrrolidinone, m-cresol, and N,N-dimethylformamide; heating to reflux yielding a polyazomethine; and precipitating the polyazomethine.

4. The soluble, amorphous, aromatic polyazomethine of claim 3, wherein the dialdehyde is selected from the group consisting of: isophthaladehyde and terephthalaldehyde.

5. The soluble, amorphous, aromatic polyazomethine of claim 3, wherein the diamine monomer is selected from the group consisting of oxybis-4,4'-diamino-2,2'-bis(trifluoromethyl)benzene; 3,5-diaminobenzotrifluoride; and 2,2'-bis(trifluoromethyl)benzidine.

6. The soluble, amorphous, aromatic polyazomethine of claim 4, wherein the dialdehyde is terephthalaldehyde.

7. The soluble, amorphous, aromatic polyazomethine of claim 5, wherein the diamine is oxybis-4,4'-diamino-2,2'-bis(trifluoromethyl)benzene.

* * * * *